United States Patent
Randolph

(10) Patent No.: US 11,433,338 B2
(45) Date of Patent: Sep. 6, 2022

(54) HIGH PRESSURE FILTER

(71) Applicant: Entegris, Inc., Billerica, MA (US)

(72) Inventor: Marshall Randolph, Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 364 days.

(21) Appl. No.: 15/742,670

(22) PCT Filed: Jul. 1, 2016

(86) PCT No.: PCT/US2016/040664
§ 371 (c)(1),
(2) Date: Jan. 8, 2018

(87) PCT Pub. No.: WO2017/007709
PCT Pub. Date: Jan. 12, 2017

(65) Prior Publication Data
US 2018/0193785 A1 Jul. 12, 2018

Related U.S. Application Data

(60) Provisional application No. 62/190,100, filed on Jul. 8, 2015.

(51) Int. Cl.
*B01D 46/00* (2022.01)
*B01D 25/00* (2006.01)
(Continued)

(52) U.S. Cl.
CPC ......... *B01D 46/0005* (2013.01); *B01D 25/00* (2013.01); *B01D 35/02* (2013.01); *B01D 35/301* (2013.01); *B01D 46/0001* (2013.01); *C22B 9/023* (2013.01); *F02M 55/004* (2013.01); *F02M 55/005* (2013.01); *F02M 61/165* (2013.01); *B01D 39/2075* (2013.01); *B01D 2201/34* (2013.01); *F02M 2200/9053* (2013.01)

(58) Field of Classification Search
CPC .... B01D 46/0005; B01D 25/00; B01D 5/301; B01D 46/0001; B01D 39/2075; B01D 2201/34; F02M 55/004; F02M 61/165; F02M 55/005; F02M 2200/9053; C22B 9/023
See application file for complete search history.

(56) References Cited

U.S. PATENT DOCUMENTS 2,005,556 A * 6/1935 Parker ................ F16L 27/04
285/148.4
2,073,442 A * 3/1937 Briggs ................ B01D 27/06
210/167.02

(Continued)

FOREIGN PATENT DOCUMENTS

EP    0 569 727 A1    11/1993
EP    0 974 749 A2    1/2000
(Continued)

*Primary Examiner* — Liam Royce

(57) ABSTRACT

A high pressure filter including first and second housings having complimentary tapered surfaces, a gasket located between the tapered surfaces, a filter element centrally disposed within the housings, and a compression collar fitted over the second housing and threaded onto the first housing is provided. Methods of making and using high pressure filters are also provided.

22 Claims, 10 Drawing Sheets

(51) Int. Cl.
   *F02M 55/00* (2006.01)
   *F02M 61/16* (2006.01)
   *B01D 35/02* (2006.01)
   *B01D 35/30* (2006.01)
   *C22B 9/02* (2006.01)
   *B01D 39/20* (2006.01)

(56) References Cited

U.S. PATENT DOCUMENTS

| | | | | |
|---|---|---|---|---|
| 2,418,247 | A * | 4/1947 | Dalzell | B01D 35/02 210/441 |
| 2,985,470 | A * | 5/1961 | Hirsch | F16L 19/0218 285/332.3 |
| 3,090,094 | A * | 5/1963 | Schwartzwalder | C04B 38/0615 264/628 |
| 3,240,342 | A * | 3/1966 | Callahan, Jr. | B01D 29/33 210/232 |
| 3,521,910 | A * | 7/1970 | Callahan, Jr. | F16L 19/00 285/14 |
| 3,794,360 | A * | 2/1974 | Bachle | F16L 23/22 285/256 |
| 5,474,586 | A * | 12/1995 | Eaton | B01D 29/33 55/341.1 |
| 6,279,540 | B1 | 8/2001 | Greaney et al. | |
| 9,655,222 | B2 | 5/2017 | Van Den Akker et al. | |
| 2001/0037975 | A1* | 11/2001 | Buhr | A61M 1/3613 210/639 |
| 2009/0183713 | A1 | 7/2009 | Bonfigli et al. | |
| 2013/0240062 | A1 | 9/2013 | Hoss | |

FOREIGN PATENT DOCUMENTS

| | | |
|---|---|---|
| EP | 2 060 775 A2 | 5/2009 |
| JP | S51-142715 A | 12/1976 |
| JP | H02254285 A | 10/1990 |
| JP | H07257629 A | 10/1995 |
| JP | 2002 310034 A | 10/2002 |
| JP | 2004-74086 A | 3/2004 |
| JP | 2013-70040 A | 4/2013 |
| JP | 2014-531705 A | 11/2014 |

* cited by examiner

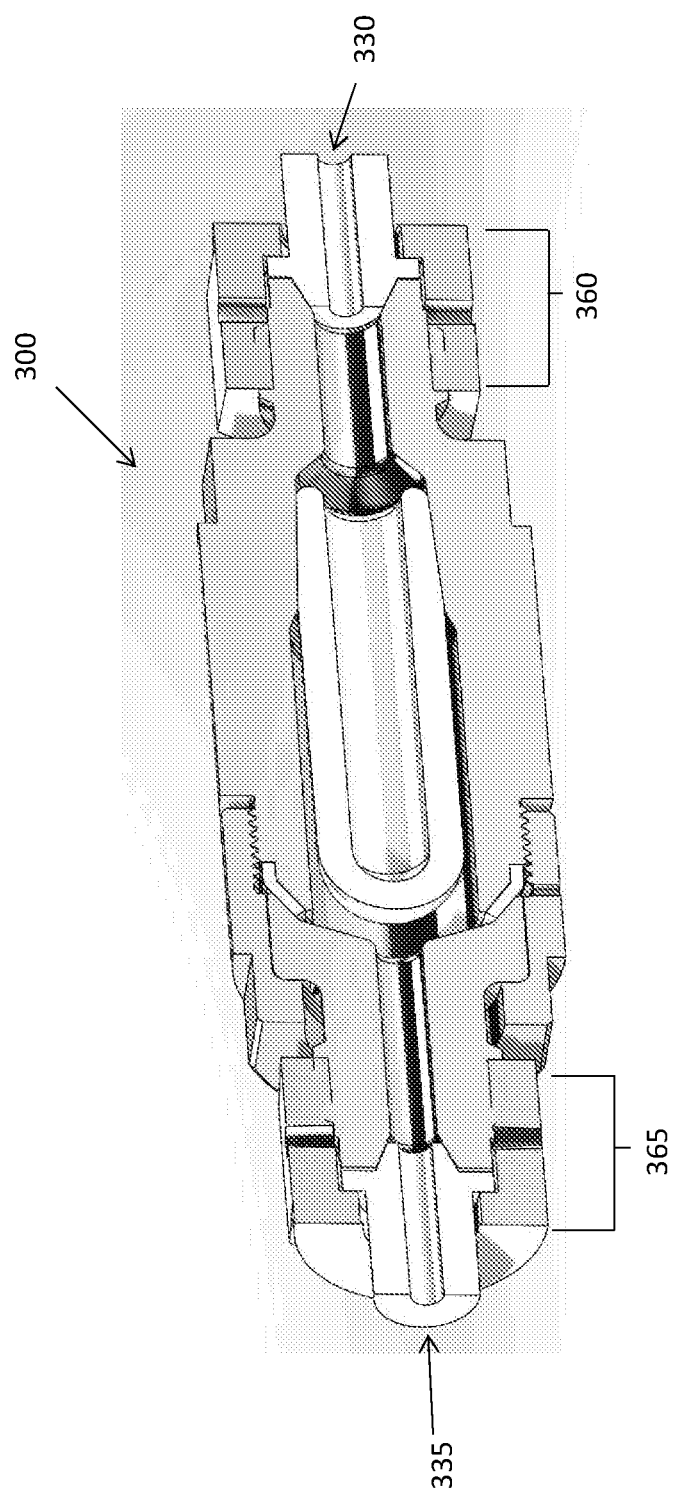

HIGH PRESSURE FILTER

RELATED APPLICATIONS

This application claims the benefit of International Application No. PCT/US2016/040664, filed Jul. 1, 2016, which in turn claims priority to U.S. Provisional Application No. 62/190,100 filed on Jul. 8, 2015, both of which are incorporated herein by reference in their entireties for all purposes.

BACKGROUND OF THE INVENTION

Semiconductor manufacturing operations require high purity metals, such as tin, and high purity gases, such as hydrogen bromide, that are free from impurities, contaminants, and particulates that can disrupt processes and cause defects in work being produced. The filtration of molten metals in particular requires that filtration be performed at high temperatures and pressures. Filters for the filtration of molten metals must provide leak-proof seals at high temperatures, for example, temperatures greater than 200° C., and high pressures, for example, up to 8000 psig.

The devices and methods taught in the prior art do not necessarily meet the requirements of today's customers in the semiconductor industry. There is a continuing need for filters that provide leak-proof performance at high temperatures and pressures for the filtration of molten metals and gases.

SUMMARY OF THE INVENTION

This invention pertains to high pressure filters, as well as methods of making and using high pressure filters, for removing impurities, contaminants, and particulates that may be present in molten metals or gases.

In a version of the present invention, a high pressure filter comprises a first housing and a second housing, each of the housings having a tapered surface on a first end and a fluid fitting on a second end. The tapered surface of the second housing is tapered complimentary to the tapered surface of the first housing, and a gasket is located between the tapered surfaces of the first and second housings. A filter element is centrally disposed within the first and second housings. At least a portion of the exterior surface of the first housing is threaded and a compression collar is fitted over the second housing and threaded onto the first housing.

In a particular version of the invention, the first and second housings comprise molybdenum. Alternatively, the first and second housings comprise alumina, silicon carbide, stainless steel, nickel, or nickel alloys. The compression collar can comprise molybdenum, stainless steel, nickel, or nickel alloys. The gasket can comprise tantalum, titanium, stainless steel, nickel, or nickel alloys.

In another version of the invention, the tapered surface of the first housing is tapered at an angle different from the tapered surface of the second housing, which can enhance compression of the gasket located between the tapered surfaces. In versions of the present invention, high pressure filters are leak-proof at temperatures of about 200 to about 400° C., or of about 250 to about 300° C. High pressure filters of the present invention can be leak-proof during operation at a pressure of up to about 8000 psig.

In further versions of the invention, the gasket includes a flange, which can prevent slipping or movement of the gasket between the tapered surfaces of the housings. The filter element centrally disposed within the housings can be a sintered powder porous filter element. The fluid fittings can be VCR, Vacuum Coupling Radius seal fittings or compression fittings.

In another version of the invention, a method of filtering a liquid or gas feed comprises providing a high pressure filter, introducing a feed containing contaminants into the high pressure filter, and recovering the feed, purified from contaminants, from the high pressure filter. The feed can travel along a flowpath through the filter element, from the fluid fitting of the first housing to the fluid fitting of the second housing, with the contaminants remaining within the filter element. The feed can be a liquid metal or a gas.

In a further version of the invention, a method of making a high pressure filter comprises heating a first housing of a high pressure filter, fitting a sintered powder porous filter element into the first molybdenum housing, placing a gasket over a tapered surface of the first housing, placing a second housing with a complementary tapered surface in sealing contact with the gasket and the first housing, and threading a compression collar over the second housing and onto at least a portion of the first housing, thereby providing a leak-proof seal between the first and second housings.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a section view of a high pressure filter in accordance with one version of the invention.

DETAILED DESCRIPTION OF THE INVENTION

Figure 1A:
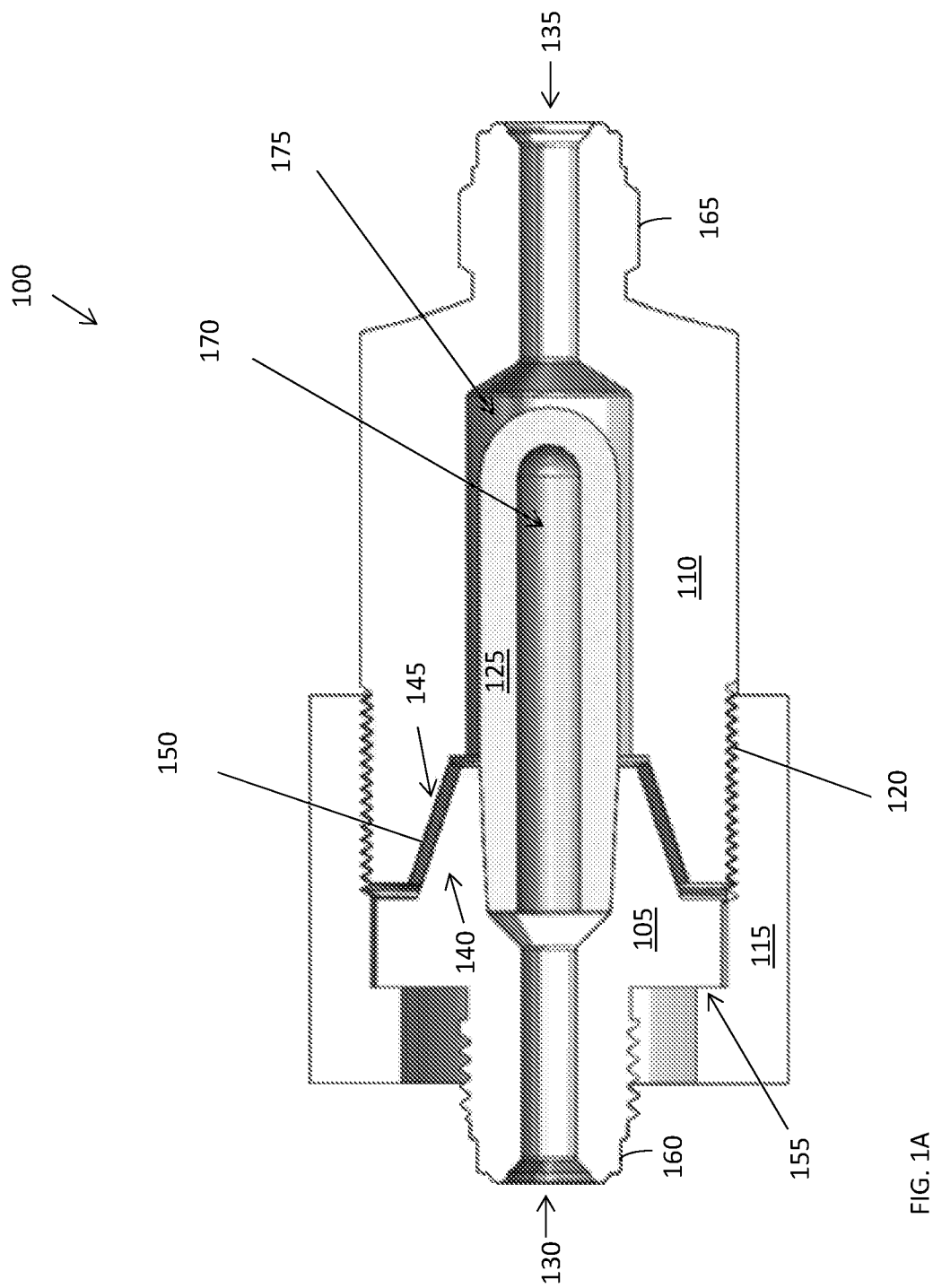
FIG. 1A is a section view of a high pressure filter in accordance with one version of the invention.

While this invention will be particularly shown and described with references to example embodiments thereof, it will be understood by those skilled in the art that various changes in form and details may be made therein without departing from the scope of the invention encompassed by the appended claims.

While various compositions and methods are described, it is to be understood that this invention is not limited to the particular compositions, designs, methodologies or protocols described, as these may vary. It is also to be understood that the terminology used in the description is for the purpose of describing the particular versions or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "filter element" is a reference to one or more filter elements and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of versions of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some versions the term "about" refers to ±10% of the stated value, in other versions the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

A description of example embodiments of the invention follows.

FIG. 1 is a section view of a high pressure filter in accordance with one version of the invention. The high pressure filter 100 includes a first housing 105 and a second housing 110. The first housing 105 has a male tapered region 140 and the second housing 110 has a complementary female tapered region 145. Tapered regions 140, 145 may alternately be referred to as sealing surfaces. Between the male tapered region 140 and the female tapered region 145 is a tapered gasket 150. A threaded compression collar 115 has a step edge 155 that engages the first housing 105 and a threaded region that engages with threads 120 located about the exterior surface of the second housing 110. The threading of compression collar 115 onto the second housing 110 compresses the gasket 150 between the first housing 105 and the second housing 110 and can provide a liquid and/or gas tight seal between the two housings.

Figure 1B:
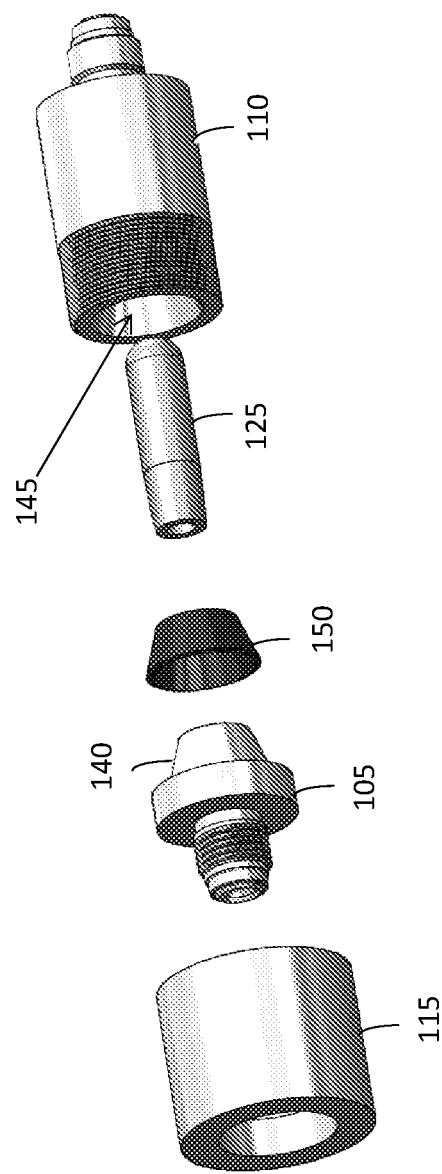
FIG. 1B is an exploded view of components of the high pressure filter of FIG. 1A.
Figure 1C:
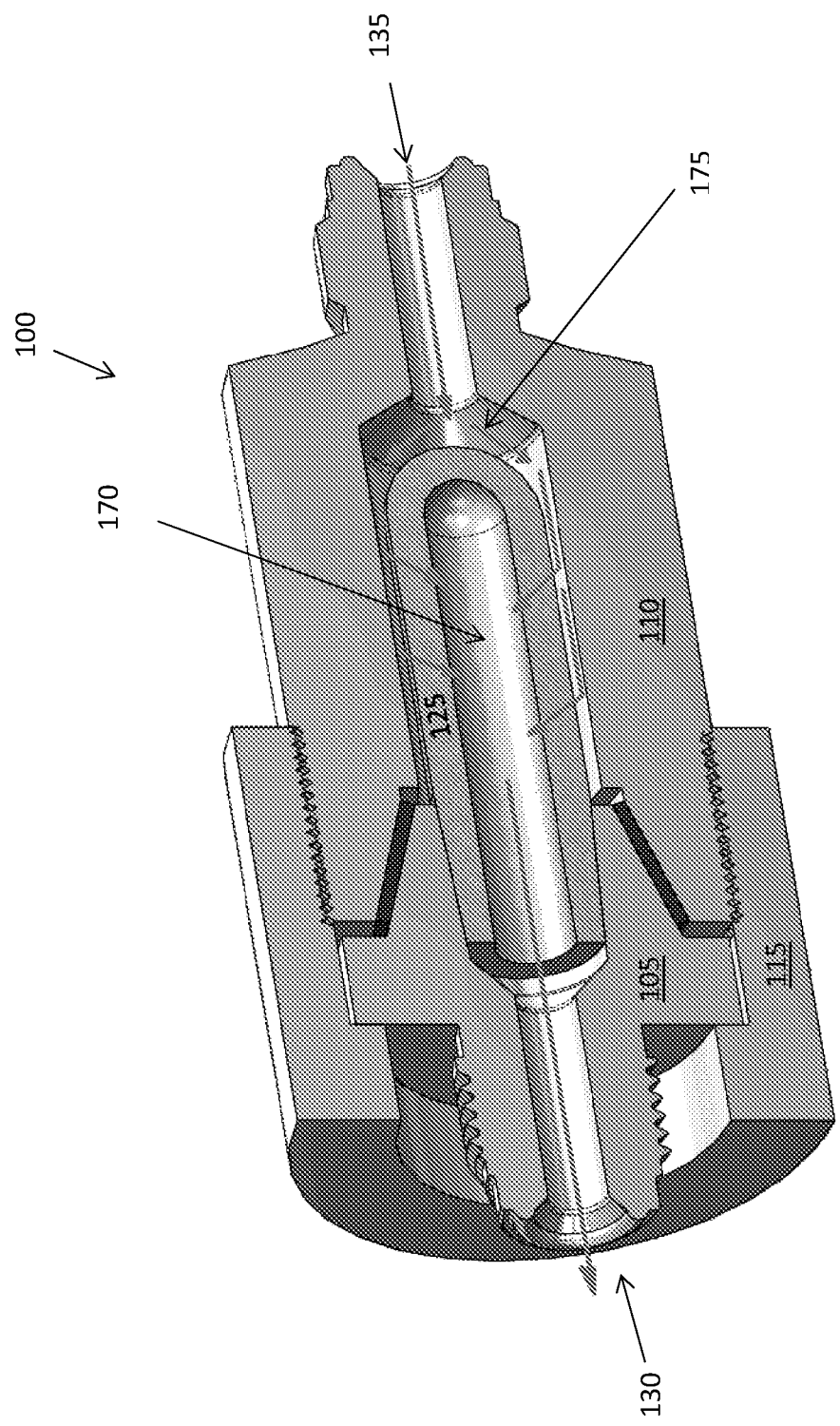
FIG. 1C is a perspective view of a cross section of the high pressure filter of FIG. 1A with fluid flow path arrows.

A filter element 125 is disposed within the first housing 105 and the second housing 110. On one end, the filter element 125 is in fluid communication with fluid fitting 160 of the first housing 105, and on the other end, fluid fitting 165 of the second housing 110. Fluid fitting 165 provides an inlet port 135 to the high pressure filter 100, and fluid fitting 160 provides an outlet port 130 from the high pressure filter 100. The fluid fittings 160, 165 allow for connection of the high pressure filter 100 to a fluid flow circuit. Fluid fittings 160, 165 are shown in FIGS. 1A-1C as male fittings but can also be configured to be female fittings or another configuration. Fluid fittings 160, 165 can be Vacuum Coupling Radius seal fittings (Swagelok, Solon, Ohio) (as shown in FIG. 1), compression fittings, or another fitting type, depending upon the application and fluid flow circuit into which the filter is to be inserted.

The first and second housings 105, 110 can be molybdenum housings, appropriate for applications involving the filtration of molten metals, such as liquid tin. The compression collar 115 can be formed of molybdenum or another material with a same or similar coefficient of thermal expansion (CTE) as molybdenum. The gasket 150 can be a tantalum gasket.

Alternatively, the first and second housings 105, 110 can be formed from alumina, silicon carbide, nickel, nickel alloys, or stainless steel, where, for example, the application involves the filtration of a gas or liquid that does not require the use of molybdenum. The compression collar 115 can be formed of nickel, nickel alloys, or stainless steel, or another material with a same or similar CTE as stainless steel, nickel, or nickel alloys. The gasket 150 can be a titanium, stainless steel, nickel, or nickel alloy gasket.

An exploded view of the component parts of high pressure filter 100 is shown in FIG. 1B. Methods of making the high pressure filter 100 include press fitting or interference fitting of the filter element 125 into the first housing 105. By means of an induction coil or furnace, first housing 105 can be heated to an elevated temperature in an inert environment to expand the housing material, for example, about 400° to about 800° F., depending upon the CTE of the housing and filter element materials. A first end of filter element 125, which may be cold or cooler than the heated second housing 110, can then be inserted into a cavity of the first housing 105 with sufficient inertia for the conical filter element 125 to firmly engage with at least a portion of the interior of first housing 105. After the housing is cooled, filter element 125 is prevented from slipping out of first housing 105 due to the shrink fitting process. The tapered gasket 150 is placed over and around the protruding end of filter element 125 such that it lies flush against male tapered region 140. The second housing 110 is then placed over the protruding end of the filter element 125 such that its female tapered region 145 is flush against the gasket 150. Alternatively, filter element 125 may be press, interference, or shrink fit into second housing 110. The compression collar 115 is placed over first housing 105, such that step edge 155 engages the first housing 105, and is threaded onto the second housing 110. As the compression collar 115 is threaded onto the second housing 110, the gasket is compressed between the two housings 105, 110.

Methods of using high pressure filter 100 include placing the high pressure filter 100 in a fluid (or gas) flow circuit where a liquid (or gas) feed, such as a molten metal, is introduced through inlet port 135. FIG. 1C illustrates a flow path, indicated by arrows, of liquid feed through the high pressure filter 100. From inlet port 135, liquid feed travels through a flow path within the second housing 110 to a hollow region 175 (formed by the interior walls of a cavity within second housing 110) surrounding filter element 125. The liquid feed filters through filter element 125 and arrives at hollow region 170 within the filter element 125, where it is able to exit high pressure filter 100 through outlet port 130.

Figure 2A:
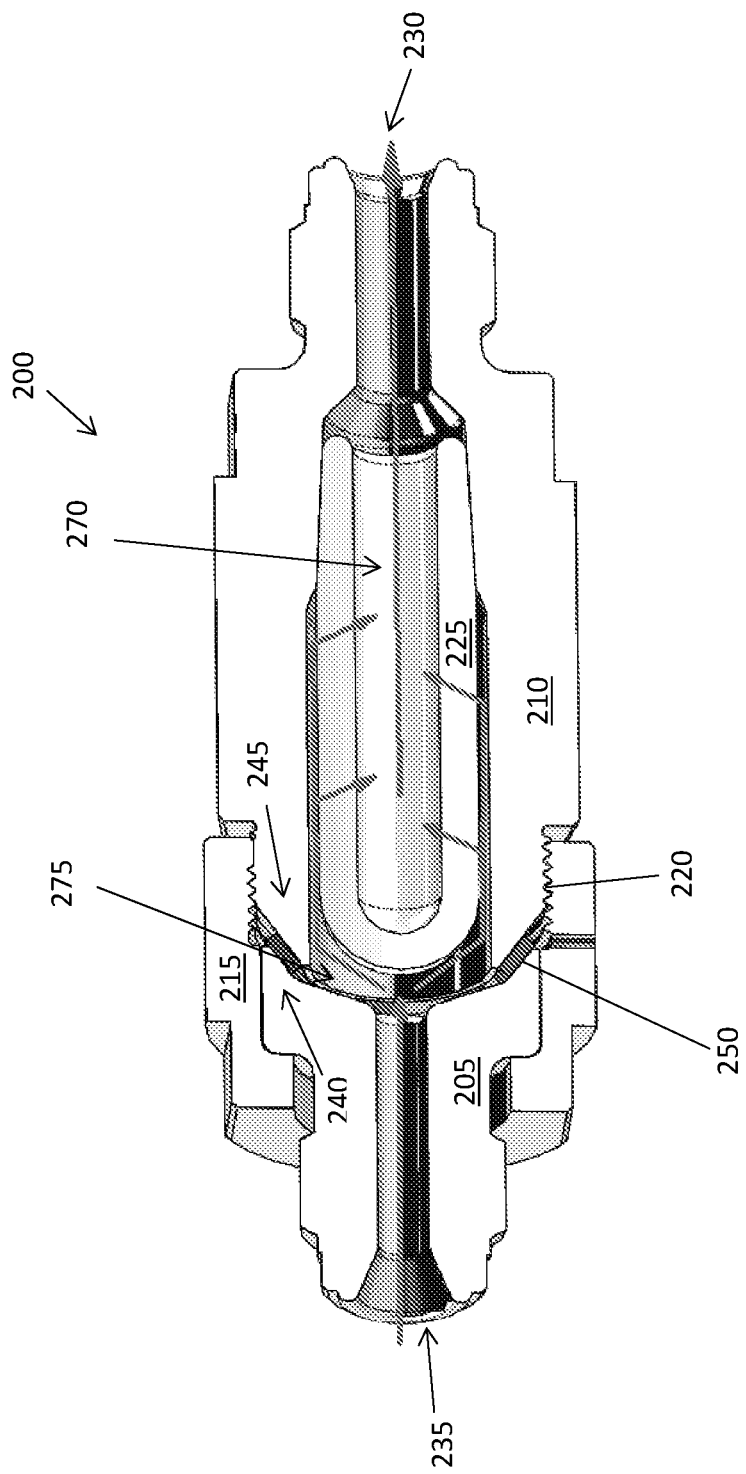
FIG. 2A is a section view of a high pressure filter in accordance with one version of the invention with a flow path illustrated by arrows.

FIG. 2A is a section view of a high pressure filter in accordance with a further version of the invention. The sealing surfaces of the first and second housings of a high pressure filter can have alternative configurations. As shown in FIG. 2A, high pressure filter 200 has a first housing 205 having a female tapered region 240 and a second housing 210 having a male tapered region 245. The orientation of filter element 225 is reversed from that of filter element 125 (FIG. 1), such that a liquid feed entering the filter 200 from inlet port 235 reaches the hollow region 275 (formed by the interior walls of a cavity or cavities within first and/or second housings 205, 210) before filtering through filter element 225. Arrows display the flow path from inlet port 235, through filter element 225 into hollow region 270, and to outlet port 230.

Figure 2B:
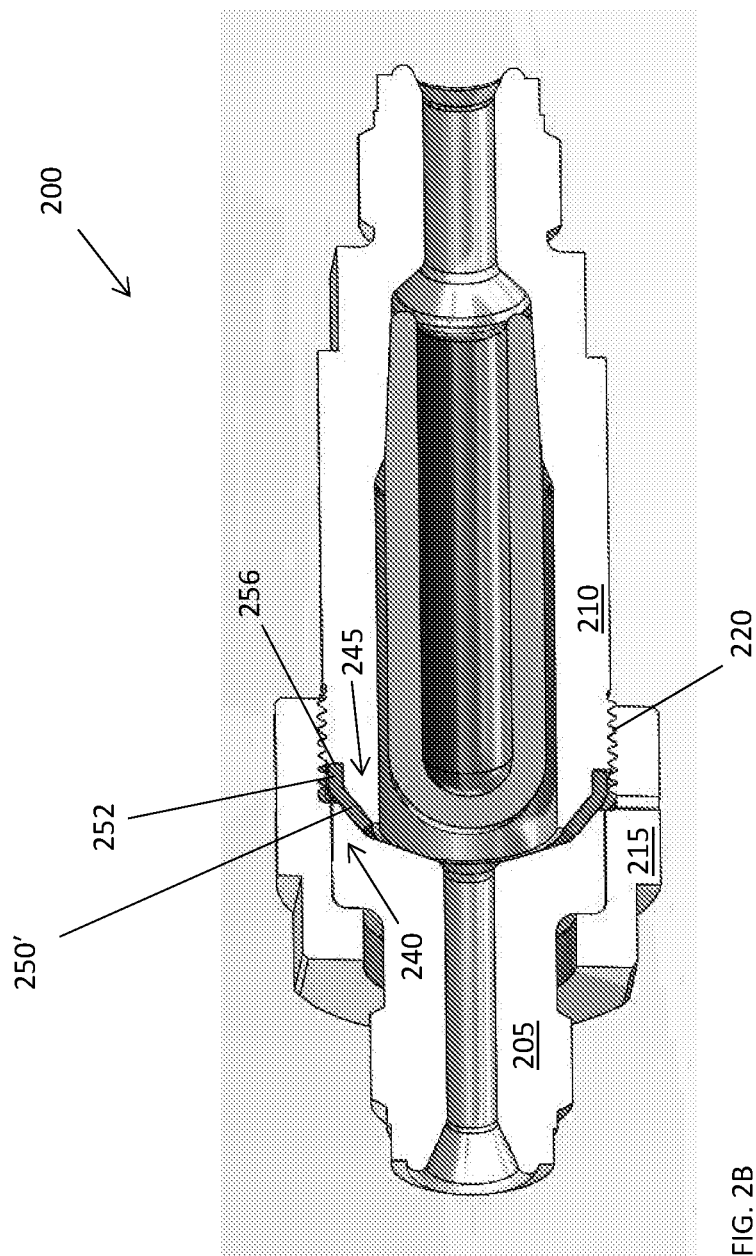
FIG. 2B is a section view of the high pressure filter of FIG. 2A with another version of a gasket.

FIG. 2B is section view of the high pressure filter of FIG. 2A with an alternative gasket, 250' that includes a flange 252. As shown in FIG. 2B, flange 252 extends beyond the sealing surfaces of tapered regions 240, 245, and occupies a space between first housing 205 and second housing 210. Flange 252 can prevent the movement of gasket 250' between the sealing surfaces of tapered regions 240, 245. For example, during the application (e.g., threading) of compression collar 215 onto the first and second housings 205, 210, gasket 250 may slide against tapered regions 240, 245, moving in a direction away from first housing 205 and towards threaded region 220 (FIG. 2A). Flange 252 can make contact with a lip 256 in second housing 210, thereby maintaining the position of gasket 250' between the sealing surfaces of tapered regions 240, 245 (FIG. 2B).

FIG. 3 is a section view of a high pressure filter in accordance with a further version of the invention. High pressure filter 300 has compression fittings 360, 365 for connection to other components within a fluid flow circuit providing, respectively, inlet port 330 and outlet port 335. Compression fittings can be used for high pressure applications of up to about 8000 psig.

Figure 4:
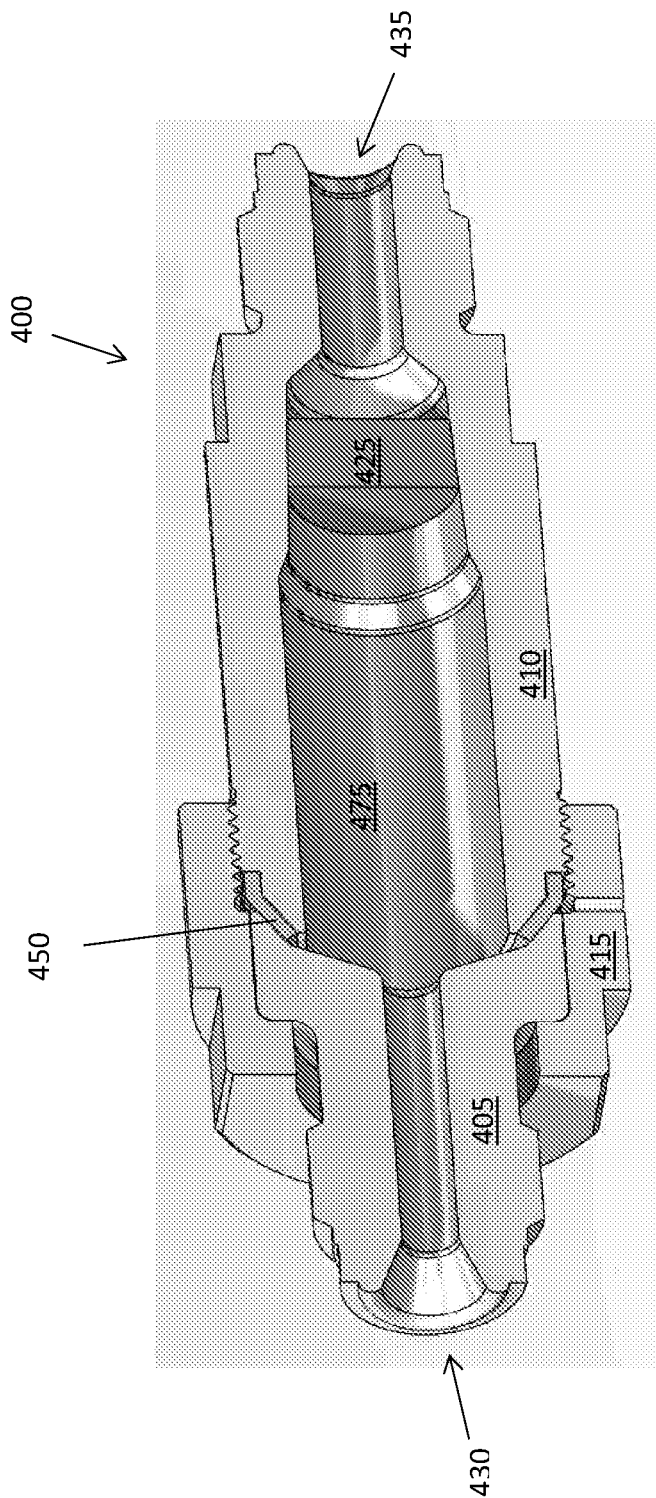
FIG. 4 is a section view of a high pressure filter in accordance with one version of the invention.

FIG. 4 is a section view of a high pressure filter in accordance with another version of the invention. A high pressure filter 400 is shown with a thick disk filter element 425, in place of the conical, tapered filter elements 125, 225, 325 shown in FIGS. 1-3. First housing 405 and second housing 410, connected by compression collar 415, form a seal with gasket 450. A liquid feed can enter through inlet port 430 of first housing 405 and travel through to a hollow region 475 within second housing 410. At least portion of the interior of the second housing 410 is occupied by the thick disk filter element 425, which filters the liquid feed as the feed passes through hollow region 475. The filtered liquid feed can then travel out of high pressure filter 400 through outlet port 435. Alternative shapes of filter elements may be used.

Filter elements 125, 225, 325 425 can be sintered porous filter elements for the filtration of liquid metals and gases. Porous filter elements and methods of making such filter elements are described in U.S. Pat. No. 3,090,094 filed on Feb. 21, 1961; U.S. Pat. No. 4,024,056 filed on Jul. 21, 1977; U.S. Pat. No. 4,278,544 filed on Mar. 26, 1980; U.S. Pat. No. 4,528,099 filed on Jun. 6, 1983; U.S. Pat. No. 4,713,180 filed on Feb. 13, 1985; U.S. Pat. No. 5,998,322 filed on Aug. 18, 1998; U.S. Pat. No. 8,802,003 filed on Oct. 20, 2011; and U.S. Pat. No. 8,869,993 filed on Apr. 14, 2011; the teachings of which are incorporated by reference. Porous filters elements and methods of making such filter elements are further described in Sleptsov V. M. and Kubli S. A., Sintered Filters From Refractory Compounds, Powder Metallurgy and Metal Ceramics, Volume 2, Issue 6, pages 470-472 (1963); Brockmeyer, J. W. and Aubrey, L. S., Application of Ceramic Foam Filters in Molten Metal Filtration, in Application of Refractories: Ceramic Engineering and Science Proceedings, Volume 8, Issue 1/2 (W. J. Smothers, ed. 1987), John Wiley & Sons, Inc., Hoboken, N.J.; Reed, E. L., Stability of Refractories in Liquid Metals, Journal of the American Ceramic Society, 37: 146-152 (1954); and Soskov D. A. et al., Use of Refractory Filters to Refine Steels and Alloys in a Vacuum, Metallurgist, Volume 33, Issue 5, page 95 (1989); the teachings of which are incorporated reference. Materials for the filter element are commercially available, including ceramic and metal foams from Ultramet (Pacoima, Calif.); alumina from CoorsTek (Golden, Colo.), and ceramics from STC (St. Albans, Vt.).

Filter elements 125, 225, 325 425 can have a range of pore sizes of about 0.1 to about 5 microns, or of about 0.5 to about 1.5 microns, as measured by bubble point per ASTM E128. Filter elements 125, 225, 325 425 can comprise the following materials: Titanium, Tungsten, Tantalum, Molybdenum, Niobium, Alumina, Titanium Oxide, Titanium Nitride, and Silicon Carbide. Filter elements may comprise any oxides of metals that will not corrode in the presence of the molten metal, or gas, that is to be filtered.

Filter elements of the present invention can be used for the filtration of a variety of liquid metals and gases. For example, filter elements of the present invention can be used to filter gases ranging from inert gases, such as argon, to corrosive gases, such as hydrogen bromide. Gases that can be filtered include, for example, argon, nitrogen, carbon dioxide, hydrogen bromide, and hydrogen chloride, and hydrides. Filter elements of the present invention can also be used to filter supercritical fluids, such as carbon dioxide in a supercritical state.

Filter elements of the present invention can be used to filter liquids including molten metals. Metals that can be filtered include tin, lead, sodium, cadmium, selenium, mercury, and, in general, materials that melt below about 400° C.

A listing of liquids and gases with corresponding example housing and gasket materials are shown in Table 1.

TABLE 1

| Liquid or Gas Feeds and Corresponding Filter Materials | | |
|---|---|---|
| Gas or Liquid Feed | Housing | Gasket |
| Ar | Molybdenum | Tantalum |
| Ar | Molybdenum | Stainless Steel |
| Ar | Molybdenum | Alumina |
| Ar | Molybdenum | Nickel, Nickel Alloy |
| Ar | Stainless Steel | Titanium |
| Ar | Stainless Steel | Stainless Steel |
| Ar | Stainless Steel | Nickel, Nickel Alloy |
| Ar | Alumina | Titanium |
| Ar | Alumina | Stainless Steel |
| Ar | Alumina | Nickel, Nickel Alloy |
| Ar | Nickel, Nickel Alloy | Titanium |
| Ar | Nickel, Nickel Alloy | Stainless Steel |
| Ar | Nickel, Nickel Alloy | Nickel, Nickel Alloy |
| $N_2$ | Molybdenum | Tantalum |
| $N_2$ | Molybdenum | Stainless Steel |
| $N_2$ | Molybdenum | Alumina |
| $N_2$ | Molybdenum | Nickel, Nickel Alloy |
| $N_2$ | Stainless Steel | Titanium |
| $N_2$ | Stainless Steel | Stainless Steel |
| $N_2$ | Stainless Steel | Nickel, Nickel Alloy |
| $N_2$ | Alumina | Titanium |
| $N_2$ | Alumina | Stainless Steel |
| $N_2$ | Alumina | Nickel, Nickel Alloy |
| $N_2$ | Nickel, Nickel Alloy | Titanium |
| $N_2$ | Nickel, Nickel Alloy | Stainless Steel |
| $N_2$ | Nickel, Nickel Alloy | Nickel, Nickel Alloy |
| HBr | Molybdenum | Tantalum |
| HBr | Molybdenum | Stainless Steel |
| HBr | Molybdenum | Alumina |
| HBr | Molybdenum | Nickel, Nickel Alloy |
| HBr | Stainless Steel | Titanium |
| HBr | Stainless Steel | Stainless Steel |
| HBr | Stainless Steel | Nickel, Nickel Alloy |

TABLE 1-continued

Liquid or Gas Feeds and Corresponding Filter Materials

| Gas or Liquid Feed | Housing | Gasket |
|---|---|---|
| HBr | Alumina | Titanium |
| HBr | Alumina | Stainless Steel |
| HBr | Alumina | Nickel, Nickel Alloy |
| HBr | Nickel, Nickel Alloy | Titanium |
| HBr | Nickel, Nickel Alloy | Stainless Steel |
| HBr | Nickel, Nickel Alloy | Nickel, Nickel Alloy |
| HCl | Molybdenum | Tantalum |
| HCl | Molybdenum | Stainless Steel |
| HCl | Molybdenum | Alumina |
| HCl | Molybdenum | Nickel, Nickel Alloy |
| HCl | Stainless Steel | Titanium |
| HCl | Stainless Steel | Stainless Steel |
| HCl | Stainless Steel | Nickel, Nickel Alloy |
| HCl | Alumina | Titanium |
| HCl | Alumina | Stainless Steel |
| HCl | Alumina | Nickel, Nickel Alloy |
| HCl | Nickel, Nickel Alloy | Titanium |
| HCl | Nickel, Nickel Alloy | Stainless Steel |
| HCl | Nickel, Nickel Alloy | Nickel, Nickel Alloy |
| $CO_2$ | Molybdenum | Tantalum |
| $CO_2$ | Molybdenum | Stainless Steel |
| $CO_2$ | Molybdenum | Alumina |
| $CO_2$ | Molybdenum | Nickel, Nickel Alloy |
| $CO_2$ | Stainless Steel | Titanium |
| $CO_2$ | Stainless Steel | Stainless Steel |
| $CO_2$ | Stainless Steel | Nickel, Nickel Alloy |
| $CO_2$ | Alumina | Titanium |
| $CO_2$ | Alumina | Stainless Steel |
| $CO_2$ | Alumina | Nickel, Nickel Alloy |
| $CO_2$ | Nickel, Nickel Alloy | Titanium |
| $CO_2$ | Nickel, Nickel Alloy | Stainless Steel |
| $CO_2$ | Nickel, Nickel Alloy | Nickel, Nickel Alloy |
| Sn | Molybdenum | Tantalum |
| Pb | Molybdenum | Tantalum |
| Na | Molybdenum | Tantalum |
| Cd | Molybdenum | Tantalum |
| Se | Molybdenum | Tantalum |
| Hg | Molybdenum | Tantalum |

Figure 5:
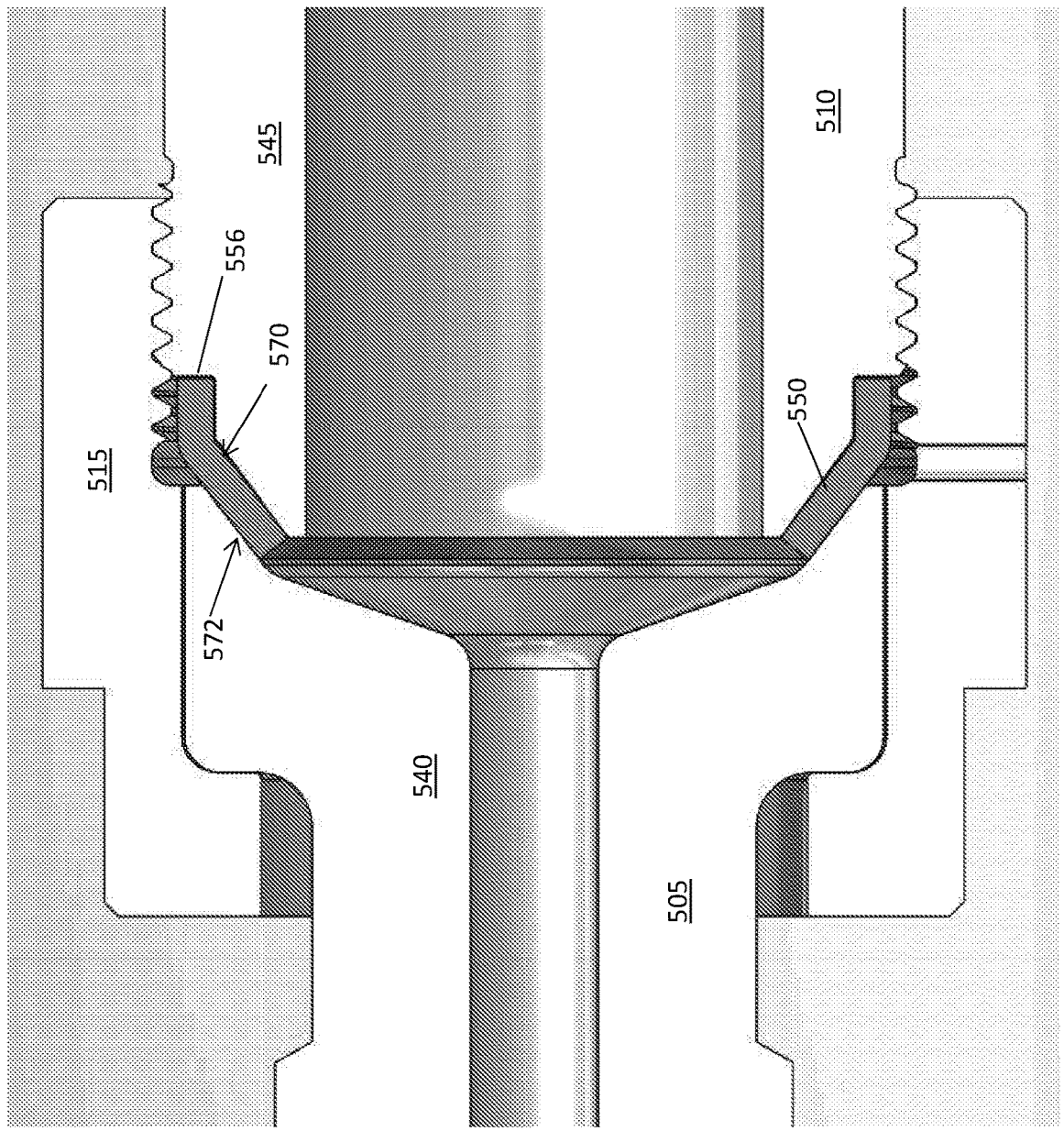
FIG. 5 is a detail view of sealing surfaces of a high pressure filter in accordance with one version of the invention.

The tapered sealing surfaces of the first and second housings can be substantially identically sloped and parallel in some embodiments. Alternatively, the sealing surfaces may be tapered at slightly different angles with respect to an axis along the center of the filter, such that they are not parallel. The sides of the gasket can also have an angle that differs from the angle of one or both sealing surfaces. The difference between an angle of a first sealing surface and a second sealing surface (and/or a gasket) can differ by less than one degree or by about one degree. For example, as shown in FIG. 5, the angle 570 of the male tapered region 545 is slightly less than the angle 572 of female tapered region 540, causing more compression and a higher sealing pressure at the smaller diameter of gasket 550. A difference in angles between the sealing surfaces can enhance the compression of the gasket and thereby improve the seal between the first and second housings 505, 510 with compression collar 515 applied.

Figure 6A:
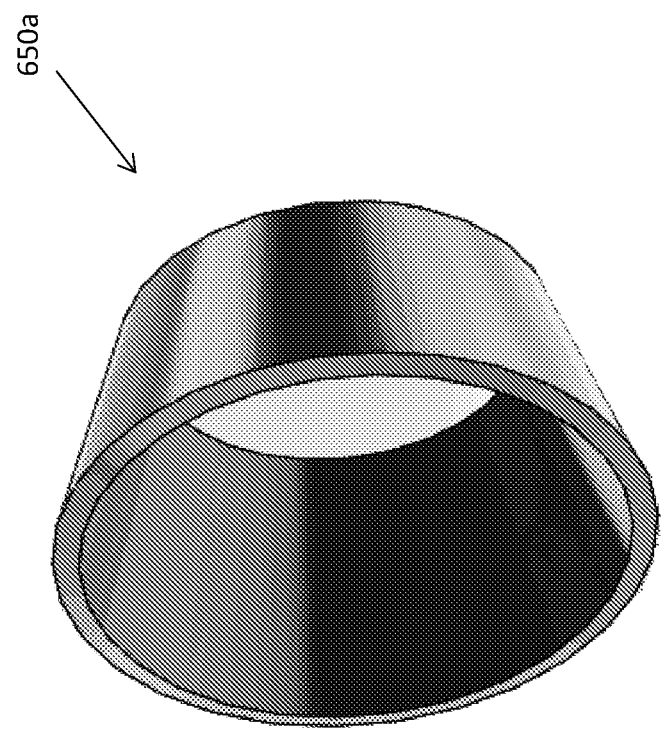
FIGS. 6A and 6B are perspective views of a gasket in accordance with one version of the invention.
Figure 6B:
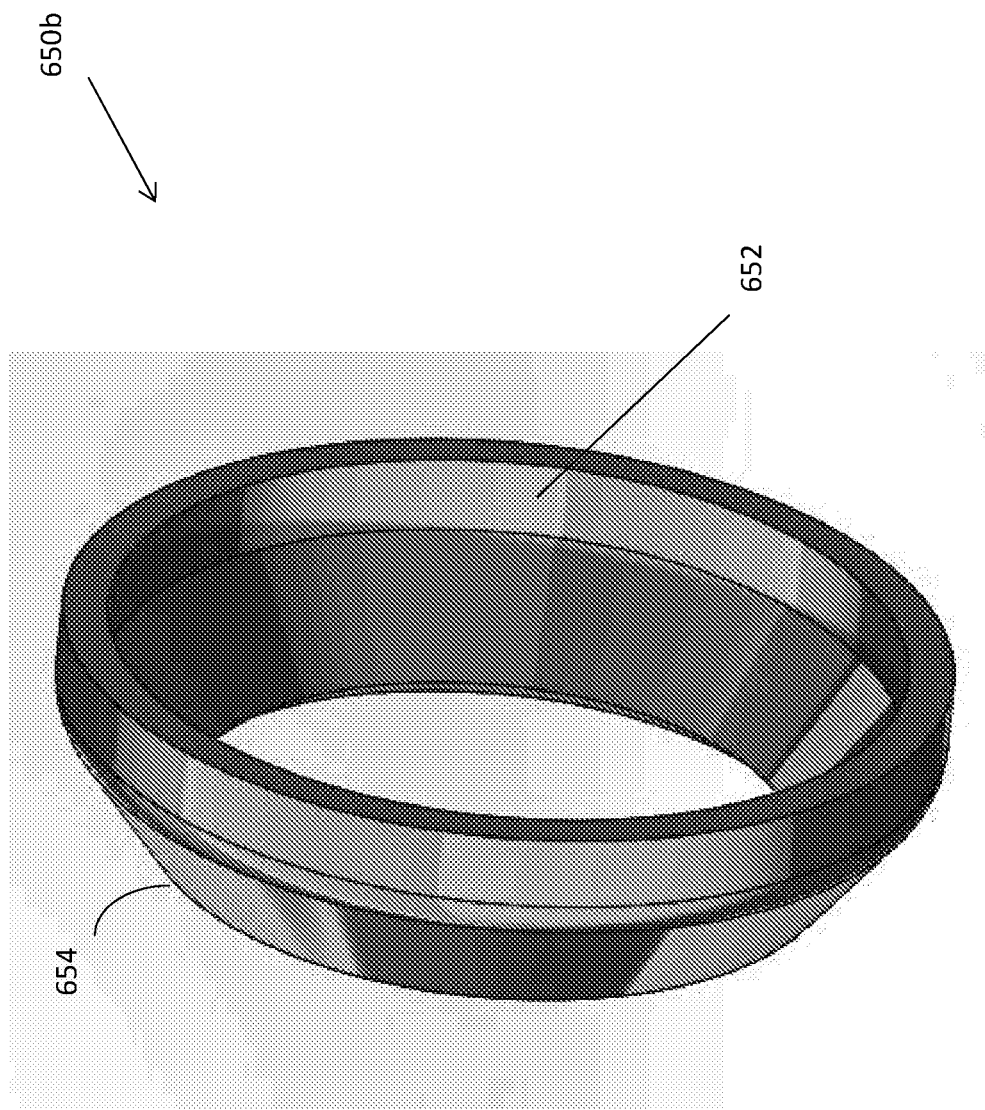

FIGS. 6A and 6B show gaskets 650a and 650b apart from other components of a high pressure filter. Gaskets 650a, 650b are conically shaped such that they have a smaller opening circumference at one end than at the other. Gasket 650b has narrower edges, while gasket 650a has wider edges. Flange 652, illustrated in FIG. 6B, extends from one end of conical region 654 of the gasket 650b. The flange 652 has a cylindrical shape with a circumference to accommodate a housing (e.g., second housing 520 as shown in FIG. 5) and butt up against a lip in the housing (e.g., lip 556 as shown in FIG. 5).

Embodiments of the present invention are directed to high pressure filters that advantageously avoid high-tolerance machining processes, or involve welding, bonding, or brazing with other materials, which can be undesirable.

For example, the welding of molybdenum results in a strength loss of up to about 50% at the weld, which makes welded molybdenum filters problematic for high pressure applications. Additionally, molybdenum can be difficult to machine to very tight tolerances required for leak-proof seals at high pressures. However, molybdenum (Mo) is a preferred material for use in filters for molten metals, such as tin, because of its heat and chemical resistance. Molybdenum is able to withstand high temperatures (for example, above the freezing point of tin) without significant expansion or softening. Tantalum (Ta) also offers heat and chemical resistance for filtration of molten metals and is a softer material than molybdenum. As such, high pressure filters of the present invention, such as those including molybdenum housings and tantalum gaskets, advantageously avoid welding or bonding processes while providing high temperature and pressure tolerance.

The advantages of high pressure filters of the present invention can also be applied to filters with housings formed from other materials, such as stainless steel and alumina, and gaskets formed from other materials, such as titanium, which can be preferred for applications involving the filtration of gases.

High pressure filters in accordance with this invention can provide leak-proof filtration of molten metals at temperatures of about 200° to about 400° C., or of about 250° to about 300° C. Further, leak-proof performance can occur at operating pressures of up to about 8000 psig.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although the present invention has been described in considerable detail with reference to certain versions thereof, other versions are possible. Therefore the spirit and scope of the appended claims should not be limited to the description and the versions contained within this specification.

The teachings of all patents, published applications and references cited herein are incorporated by reference in their entirety.

What is claimed is:

1. A high pressure filter for filtering a liquid metal or gas, comprising:
   a first housing having a male tapered surface on a first end and a fluid fitting on a second end;
   a second housing having a female tapered surface on a first end and a fluid fitting on a second end, the female tapered surface of the second housing being tapered complementary to the male tapered surface of the first housing, at least a portion of the exterior surface of the second housing being threaded;
   a sintered powder porous filter element having a pore size of from about 0.1 to about 5 microns inserted into the first housing and centrally disposed within the first and second housings;
   a gasket located between the male tapered surface of the first housing and the female tapered surface of the second housing; and
   a compression collar fitted over the first housing and threaded onto the second housing.

2. The high pressure filter of claim 1, wherein the first housing, the second housing, the compression collar or a combination thereof comprise molybdenum.

3. The high pressure filter of claim 1, wherein the first and second housings comprise stainless steel or nickel.

4. The high pressure filter of claim 1, wherein the compression collar comprises stainless steel or nickel.

5. The high pressure filter of claim 1, wherein the gasket comprises tantalum.

6. The high pressure filter of claim 1, wherein the gasket comprises a material selected from the group consisting of titanium, stainless steel, and nickel.

7. The high pressure filter of claim 1, wherein the male tapered surface of the first housing is tapered at an angle different from the female tapered surface of the second housing.

8. The high pressure filter of claim 1, wherein the high pressure filter is leak-proof during operation at temperatures of about 200 to about 400° C.

9. The high pressure filter of claim 1, wherein the high pressure filter is leak-proof during operation at temperatures of about 250 to about 300° C.

10. The high pressure filter of claim 1, wherein the high pressure filter is leak-proof during operation at a pressure of up to about 8000 psig.

11. The high pressure filter of claim 1, wherein the gasket includes a flange.

12. The high pressure filter of claim 1, wherein the sintered powder porous filter element comprises a material selected from the group consisting of titanium, tungsten, tantalum, molybdenum, niobium, alumina, titanium oxide, titanium nitride, and silicon carbide.

13. The high pressure filter of claim 1, wherein the fluid fittings are compression fittings.

14. A method of filtering a liquid metal or gas feed, comprising:
   providing a high pressure filter comprising:
      a first housing having a male tapered surface on a first end and a fluid fitting on a second end;
      a second housing having a female tapered surface on a first end and a fluid fitting on a second end, the female tapered surface of the second housing being tapered complimentary to the male tapered surface of the first housing, at least a portion of the exterior surface of the second housing being threaded;
      a sintered powder porous filter element having a pore size of from about 0.1 to about 5 microns inserted into the first housing and centrally disposed within the first and second housings;
      a gasket located between the male tapered surface of the first housing and the female tapered surface of the second housing; and
      a compression collar fitted over the first housing and threaded onto the second housing;
   introducing a feed containing contaminants into the high pressure filter, the feed travelling through a flowpath from the fluid fitting of the second housing, through the filter element, and to the fluid fitting of the first housing, the contaminants remaining within the filter element; and
   recovering the feed, purified from contaminants, from the high pressure filter.

15. The method of claim 14, wherein the feed is a liquid metal.

16. The method of claim 14, wherein the feed is a gas.

17. The method of claim 14, wherein the first and second housings comprise molybdenum and the gasket comprises tantalum.

18. The method of claim 14, wherein the first and second housings comprise a material selected from the group consisting of alumina, silicon carbide, stainless steel, and nickel and the gasket comprises a material selected from the group consisting of titanium, stainless steel, and nickel.

19. A method of making a high pressure filter for filter a liquid metal or gas, comprising:
   heating the first housing with the male tapered surface of the high pressure filter of claim 1;
   fitting the filter element having a pore size of from about 0.1 to about 5 microns into the first housing;
   placing the gasket over the male tapered surface of the first housing;
   placing the second housing with the complementary female tapered surface in sealing contact with the gasket and the first housing; and
   threading the compression collar over the first housing and onto at least a portion of the second housing, providing a leak-proof seal between the first and second housings.

20. A high pressure filter for filtering a liquid metal or gas, comprising:
   a first housing having a female tapered surface on a first end and a fluid fitting on a second end;
   a second housing having a male tapered surface on a first end and a fluid fitting on a second end, the male tapered surface of the second housing being tapered complementary to the female tapered surface of the first housing, at least a portion of the exterior surface of the second housing being threaded;
   a sintered powder porous filter element having a pore size of from about 0.1 to about 5 microns inserted into the first housing and centrally disposed within the first and second housings;
   a gasket located between the female tapered surface of the first housing and the male tapered surface of the second housing; and
   a compression collar fitted over the first housing and threaded onto the second housing.

21. The high pressure filter of claim 1, wherein the sintered powder porous filter element comprises a hollow portion into which the liquid metal or gas flows.

22. The high pressure filter of claim 20, wherein the sintered powder porous filter element comprises a hollow portion into which the liquid metal or gas flows.

* * * * *